July 14, 1931.  J. A. WINTROATH  1,814,538
TUBING TENSIONING DEVICE
Filed Dec. 10, 1927
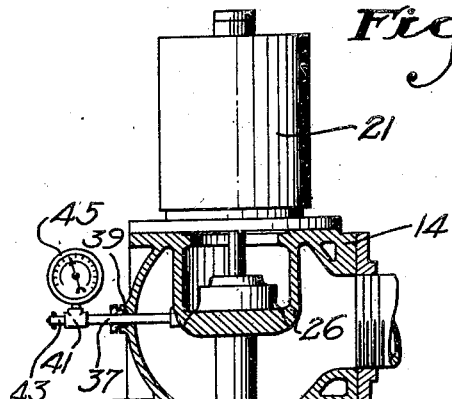
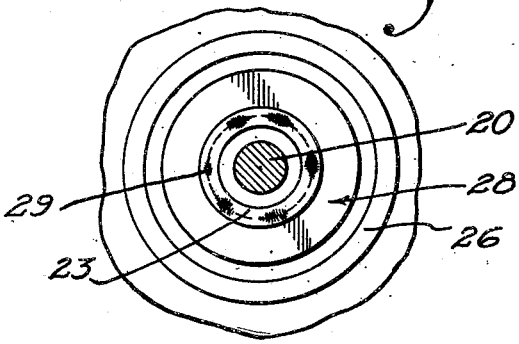
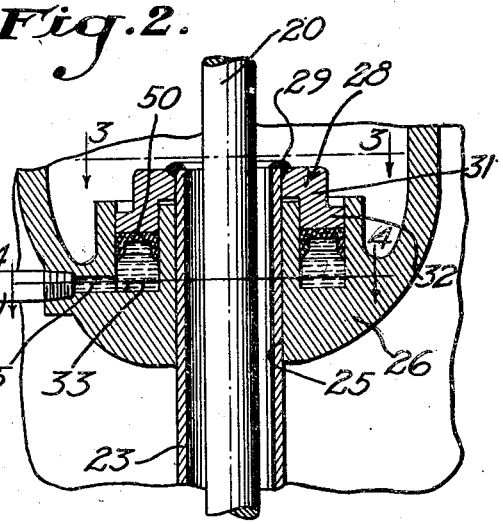
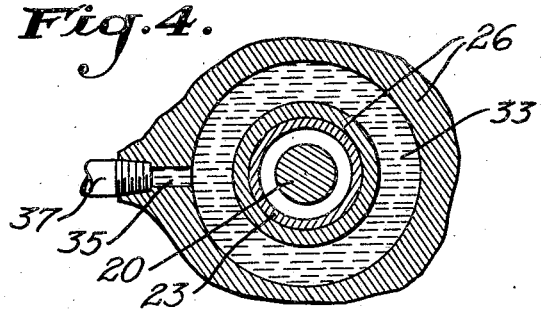
INVENTOR:
JOHN A. WINTROATH,
BY
Ford H. Harris
ATTORNEY.

Patented July 14, 1931

1,814,538

UNITED STATES PATENT OFFICE

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA

TUBING TENSIONING DEVICE

Application filed December 10, 1927. Serial No. 239,250.

My invention relates to pumps and more particularly to a device for placing a tension on a tubing in a deep well pump.

In the deep well pumping art it is common practice to set a well casing in a well which is to be pumped. A pump head is mounted on top of this casing and supports a discharge pipe, to the bottom of which pipe is connected a pump section. The pump section has one or more impellers therein which are adapted to be rotated by a shaft which extends upward through the pump head to a suitable source of energy. This source of energy may be either a direct-connected motor or a pulley adapted to be driven by some form of prime mover.

The shaft is journalled throughout its length by bearings which are mounted in a tubing. The tubing extends from the pump section upward through the pump head. Oil is usually supplied to the top of this tubing to lubricate the bearings which journal a shaft. It is common practice to thread the upper end of the tubing and screw thereon a nut which bears against a portion of the pump head. By tightening the nut it is possible to place a tension on the tubing and in this way keep the axis thereof in a straight line. Other universally recognized advantages are also gained by putting the tubing under tension.

This means of placing a tension on the tubing is open to certain objections. In the first place, the amount of tension placed on the tubing cannot be determined by such an arrangement, the operator simply screwing up on the nut until he thinks the tubing is placed under sufficient tension. If he should screw up too tightly on the nut, the threads would be stripped and expensive repairs would be necesary. After the pump has been in operation for some time, it is necessary to again tighten the nut in order to compensate for the stretch which is bound to occur when an installation is first put into operation. The common form of nut is located between the source of power and the upper end of the well so that it is necessary to remove the source of power from the pump head before the nut can be adjusted. This is usually a difficult task especially when a motor is used as a motive power and is directly connected to the shaft.

It is an object of my invention to provide a tensioning device which may be operated from the exterior of the pump head.

A further and very important object of my invention is to provide a tensioning device which will place a definitely known amount of tension on a member.

A further object of my invention is to provide an apparatus for measuring the amount of tension placed on a pump member.

Further objects and advantages of my invention will be made evident hereinafter.

In the drawings, I show one form of the invention.

Fig. 1 illustrates the utility of the invention.

Fig. 2 is a cross-sectional view of the tensioning device of my invention.

Fig. 3 is a horizontal cross-sectional view taken on the line 3—3 of Fig. 2.

Fig. 4 is a horizontal cross-sectional view taken on the line 4—4 of Fig. 2.

Referring particularly to Fig. 1, a well 11 has a well casing 12 set therein and extending from the surface of the ground to a point below the fluid level of the well. A pump head 14 is suitably secured above the well casing 12 and carries the upper end of a discharge casing 15. At the lower end of the discharge casing 15 is secured a pump section 18 which carries a suitable strainer 19 on the lower end thereof, through which fluid is drawn.

The pump section 18 has suitable impeller chambers formed therein and in each impeller chamber a turbine impeller is adapted to rotate. These impellers are secured to a shaft 20 which extends from the pump section to the pump head, this shaft being driven by any suitable means above the pump head 14. Such a means is shown in Fig. 1 as comprising a pulley 21 which is driven by a prime mover, not shown. It should be understood that the pulley 21 might be replaced by a prime mover itself, this prime mover being secured to the upper end of the pump head 14.

Secured to the pump section 18 and surrounding the shaft 20 is a shaft-enclosing tubing 23. This tubing carries bearings spaced at frequent intervals throughout its length, these bearings journalling the shaft 20. The upper end of the tubing 23 passes through a hole 25 of a saddle 26 which forms a part of the pump head 14.

An annular piston 28 is securely welded to the top of the tubing 23, as indicated at 29 in Figs. 2 and 3. This piston is supported concentric with the tubing 23 and is thus concentric with the axis of the shaft. The piston 28 has a cylindrical portion 31, at the bottom of which is a circular flange 32. The flange 32 is adapted to be vertically slidable in an annular fluid chamber 33 formed in the saddle 26. The fluid chamber 33 communicates with the exterior of the saddle 26 through an opening 35 into which is threaded a pipe 37 which extends through the exterior wall of the pump section 14, as best shown in Fig. 1. Packing means 39 is placed at the junction of the pipe 37 and this exterior wall to prevent any leakage. A T fitting 41 is attached to the outer end of the pipe 37. Attached to the T fitting 41 is a suitable nipple 43 and a pressure recording gauge 45. The nipple 43 may be of any well known type of pressure lubricating nipple. This nipple is adapted to receive a fitting of a high pressure gun which forces a fluid through the nipple 43 and into the fluid chamber 33 through the pipe 37. A ball check valve 46 in the end of the nipple 43 prevents any return flow of the fluid from the chamber 33 through the nipple 43. An annular washer 50 is secured to the lower edge of the circular flange 32, as best shown in Fig. 2. This annular washer is channel-shaped in cross-section, the edges of the channel being adapted to bear against the walls of the fluid chamber 33 to make a fluid-tight engagement therewith.

In operating my invention the pump is assembled substantially as shown in Fig. 1. Before operating the pump, however, it is desirable to place a tension on the tubing 23. In my invention this is accomplished by attaching a high pressure gun to the nipple 43 and forcing a heavy oil through the pipe 37 into the fluid chamber 33. This oil under a high pressure exerts a downward force on the saddle 26 and an equal upward force on the circular flange 32. The saddle 26 is fixed in position, but the circular flange 32 may move upward in the fluid chamber 33, carrying the tubing 23 therewith. This places a tension on the tubing 23 and a corresponding compressive stress on the discharge casing 15. The tension on the tubing 23 tends to straighten it and to allow the shaft 20 to rotate about a straight axis. The amount of pressure in the fluid chamber 33 is indicated by the gauge 45 which communicates with the pipe 37 through the T fitting 41.

By using the tensioning device of my invention it is possible to accurately determine the amount of tension placed on the tubing 23. For example, let us assume that the tubing 23 weighs ten pounds to the foot and that there are five hundred feet of tubing between the pump section 18 and the pump head 14. The total weight of this tubing will be five thousand pounds. By knowing the area of the lower edge of the circular flange 32, it is very easy to divide the total weight of the tubing by this area in square inches to determine the amount of pressure in pounds per square inch which the gauge 45 will read at the time that all the weight of the tubing 23 is carried by the piston 28. At this time there would be no tension in the lower end of the tubing 23. Any desired tension may be placed on the tubing 23 by forcing more oil through the nipple 43 and increasing the pressure in the chamber 33. This increase in pressure over the previous reading of the gauge 45 if multiplied by the area of the circular flange 32 will give the tension in the tubing 23 at the lower end thereof.

It is entirely possible to so graduate the gauge 45 that it will read the tension in the tubing 23 directly in pounds or in pounds per square inch.

After the pump has been in operation for some time, the gauge 45 will indicate a lower reading than it would when the pump was first put into service. This is due to stretch in the tubing 23 and can be easily corrected by forcing more oil through the nipple 43 until the pressure registered by the gauge 45 is brought up to the required amount.

It is within the scope of my invention to use any fluid in the chamber 33. It is also possible to use any medium which will attain a definite set with the lapse of time. Such a material might be any type of cement. If such a material is used, the pressure in the chamber 33 can be brought to the required amount, and the substance therein allowed to take a permanent set. In using such a substance, it would be difficult to adjust the tension at any later date, and for this reason I prefer to use a fluid in the chamber 33.

I claim as my invention:

1. In a pump, the combination of: a pump head; a shaft-enclosing tubing, one end of which extends into said pump head, the other end thereof being restrained from axial movement and hydraulic means for drawing said shaft-enclosing tubing a distance into said pump head to place a tension on said shaft-enclosing tubing.

2. In a pump, the combination of: a pump head having a fluid chamber therein; a shaft-enclosing tubing having one end extending into said pump head, the other end of said tubing being restrained from axial movement; a piston on said tubing, said piston being movable in said fluid chamber; and means for maintaining a fluid pressure in said chamber, said fluid pressure acting on said piston to place a tension on said tubing.

3. In a pump, the combination of: a pump structure including a pump head having walls cooperating to form an annular fluid chamber therein; a shaft-enclosing tubing having one end connected to a stationary part of said pump structure and having its other end extending into said pump head; an annular piston on said tubing, said piston being movable in said fluid chamber and forming one of the walls defining said chamber; and means for maintaining a fluid pressure in said chamber, said fluid pressure acting on said piston to move it and thereby place tension on said tubing.

4. In a deep well pump, the combination of: a pump head; a pump section; a shaft-enclosing tubing connecting said pump head and said pump section; a discharge casing connecting said pump head and said pump section; hydraulic means for raising said tubing relative to said casing to place a tension on said tubing; and means for controlling the pressure within said hydraulic means and thereby definitely controlling the amount of said tension.

5. In a deep well pump, the combination of: a pump head; a pump section; a shaft-enclosing tubing connecting said pump head and said pump section; a discharge casing connecting said pump head and said pump section; means for raising said tubing relative to said casing to place a tension on said tubing; and means for definitely determining the amount of said tension.

6. In combination in a deep well pump: a pump structure including a head having walls defining a fluid chamber; a shaft-enclosing tubing having a part extending into said pump head, said tubing having a portion thereof remote from said part connecting to a stationary part of said pump structure; a pressure actuated member defining a movable wall of said chamber, and being operatively connected to said tubing; and means for building up a fluid pressure in said chamber.

In testimony whereof, I have hereunto set my hand at Los Angeles, California, this 5th day of December, 1927.

JOHN A. WINTROATH.